US012338313B2

(12) United States Patent
Meyer et al.

(10) Patent No.: US 12,338,313 B2
(45) Date of Patent: Jun. 24, 2025

(54) POLYURETHANE MATERIAL WITH A HIGH TEMPERATURE RESISTANCE

(71) Applicant: BASF SE, Ludwigshafen am Rhein (DE)

(72) Inventors: Andre Meyer, Lemfoerde (DE); Andreas Emge, Lemfoerde (DE)

(73) Assignee: BASF SE, Ludwigshafen am Rhein (DE)

( * ) Notice: Subject to any disclaimer, the term of this patent is extended or adjusted under 35 U.S.C. 154(b) by 288 days.

(21) Appl. No.: 16/327,727

(22) PCT Filed: Aug. 21, 2017

(86) PCT No.: PCT/EP2017/070986
§ 371 (c)(1),
(2) Date: Feb. 22, 2019

(87) PCT Pub. No.: WO2018/036943
PCT Pub. Date: Mar. 1, 2018

(65) Prior Publication Data
US 2019/0225735 A1 Jul. 25, 2019

(30) Foreign Application Priority Data
Aug. 25, 2016 (EP) .................................... 16185702

(51) Int. Cl.
| | | |
|---|---|---|
| C08G 18/48 | (2006.01) | |
| C08F 283/00 | (2006.01) | |
| C08F 283/06 | (2006.01) | |
| C08G 18/08 | (2006.01) | |
| C08G 18/18 | (2006.01) | |
| C08G 18/22 | (2006.01) | |
| C08G 18/24 | (2006.01) | |
| C08G 18/32 | (2006.01) | |
| C08G 18/36 | (2006.01) | |
| C08G 18/50 | (2006.01) | |
| C08G 18/66 | (2006.01) | |
| C08G 18/76 | (2006.01) | |
| C08K 5/00 | (2006.01) | |
| C08K 7/02 | (2006.01) | |
| C09J 151/08 | (2006.01) | |
| C09J 175/08 | (2006.01) | |
| C09J 175/16 | (2006.01) | |

(52) U.S. Cl.
CPC ...... *C08G 18/4829* (2013.01); *C08F 283/006* (2013.01); *C08F 283/06* (2013.01); *C08G 18/0842* (2013.01); *C08G 18/3206* (2013.01); *C08G 18/36* (2013.01); *C08G 18/4816* (2013.01); *C08G 18/506* (2013.01); *C08G 18/6696* (2013.01); *C08G 18/7664* (2013.01); *C08K 5/0025* (2013.01); *C08K 7/02* (2013.01); *C09J 151/08* (2013.01); *C09J 175/08* (2013.01); *C09J 175/16* (2013.01); *C08G 18/18* (2013.01); *C08G 18/227* (2013.01); *C08G 18/24* (2013.01)

(58) Field of Classification Search
CPC ............ C08G 18/4829; C08G 18/4816; C08G 18/6696; C08G 18/0842; C08G 18/506; C08G 18/7664; C08G 18/3206; C08G 18/36; C08G 18/18; C08G 18/227; C08G 18/24; C09J 151/08; C09J 175/08; C09J 175/16; C08F 283/06; C08F 283/006; C08K 5/0025; C08K 7/02
See application file for complete search history.

(56) References Cited

U.S. PATENT DOCUMENTS

| | | | |
|---|---|---|---|
| 4,162,357 A | 7/1979 | Heine et al. | |
| 6,239,209 B1 * | 5/2001 | Yang .................. | C08F 283/006 525/131 |
| 7,504,543 B2 * | 3/2009 | Ruppel .............. | C08G 18/4866 528/76 |
| 8,362,099 B2 * | 1/2013 | Harre ................. | C08G 18/4837 521/174 |
| 2002/0187857 A1 * | 12/2002 | Kuntimaddi .......... | A63B 37/06 473/373 |
| 2006/0089453 A1 * | 4/2006 | Pajerski ................ | C08G 18/36 524/589 |
| 2007/0259981 A1 * | 11/2007 | Eling ..................... | C08J 9/141 521/99 |

FOREIGN PATENT DOCUMENTS

| | | |
|---|---|---|
| DE | 102008002008 A1 | 12/2008 |
| EP | 0090444 A2 | 10/1983 |

(Continued)

OTHER PUBLICATIONS

European Search Report for EP Patent Application No. 16185702.4, Issued on Feb. 23, 2017, 3 pages.

(Continued)

Primary Examiner — Rabon A Sergent
(74) Attorney, Agent, or Firm — Armstrong Teasdale LLP

(57) ABSTRACT

Described herein is a process for preparing a polyurethane-type fiber composite material, said process including (a) di- and/or polyisocyanates, (b) compounds having isocyanate-reactive hydrogen atoms, (c) compounds including at least one carbon-carbon double bond, (d) optionally a catalyst to hasten a urethane reaction, (e) optionally a free-radical initiator, and (f) optionally further auxiliary and added-substance materials, being mixed into a reaction mixture—with concomitant wetting of a fiber material—and cured. Also described herein is a polyurethane-type fiber composite material obtainable by a process described herein and also to a method of using the polyurethane-type fiber composite material as a structural component part.

12 Claims, No Drawings

(56) References Cited

FOREIGN PATENT DOCUMENTS

| EP | 0989146 A1 | 3/2000 |
|----|------------|--------|
| EP | 1460094 A1 | 9/2004 |
| NO | 2008119973 A1 | 10/2008 |
| WO | 2013083632 A1 | 6/2013 |
| WO | 2015081068 A1 | 6/2015 |
| WO | 2015155195 A1 | 10/2015 |
| WO | 2016087366 A1 | 6/2016 |
| WO | 2018036790 A1 | 3/2018 |

OTHER PUBLICATIONS

International Search Report for International Application No. PCT/EP2017/070986, Issued on Nov. 17, 2017, 2 pages.

* cited by examiner

POLYURETHANE MATERIAL WITH A HIGH TEMPERATURE RESISTANCE

CROSS-REFERENCE TO RELATED APPLICATIONS

This application is a U.S. National Phase Application of PCT/EP2017/070986, filed Aug. 21, 2017, which claims the benefit of priority to European Patent Application No. 16185702.4, filed Aug. 25, 2016, the entire contents of which are hereby incorporated by reference herein.

FIELD OF INVENTION

The present invention relates to processes for preparing a polyurethane material, said process comprising (a) di- and/or polyisocyanates, (b) compounds having isocyanate-reactive hydrogen atoms, (c) compounds comprising at least one carbon-carbon double bond, (d) optionally a catalyst to hasten the urethane reaction, (e) optionally a free-radical initiator, and (f) optionally further auxiliary and added-substance materials, being mixed into a reaction mixture and cured, wherein the compounds having isocyanate-reactive hydrogen atoms contain on average not less than 1.5 isocyanate-reactive hydrogen groups per molecule, the double bond density of compound (c) is not less than 21% and the double bond functionality of compound (c) is greater than 1 and said compound (c) has no isocyanate-reactive groups, and the equivalence ratio between isocyanate groups of di- and/or polyisocyanates (a) and the isocyanate-reactive hydrogen atoms of compounds (b) is in the range from 0.8 to 2. The present invention further relates to a polyurethane material obtainable by a process of the present invention and also to the method of using the polyurethane material, in particular a polyurethane-type fiber composite material as structural component parts.

BACKGROUND

Polyurethane materials are widely usable, but their in-service properties at high temperatures are frequently worthy of improvement. Polyurethane-type fiber composite materials are known and are typically obtained by pultrusion, filament winding processes or impregnation processes, such as vacuum infusion. The fiber composite materials thus obtained combine a relatively low weight of material with hardness, stiffness, corrosion resistance and ease of processing. Polyurethane-type fiber composite materials are used, for example, as body exterior parts in a vehicle construction, as ships' hulls, masts, poles, pylons, for example as utility poles or telegraph poles, or rotor blades for wind power systems.

It is the maintenance of the good material-related properties at comparatively high temperatures which is capable of improvement. One attempt in this direction involves increasing the glass transition temperature of the polyurethane-type fiber composite material. High temperature resistant materials are also needed for the automotive industry's painting process known as cathodic electrocoating.

U.S. Pat. No. 4,162,357 a process for preparing heat-resistant synthetic resins wherein polyisocyanates with a trimerization catalyst and at least one from a polymerizable, unsaturated monomer, organic epoxies and 0.05 to 0.5 equivalent, based on the isocyanate groups of compounds having isocyanate-reactive hydrogen atoms.

WO 2008/119973, WO 2015155195 and WO2016087366 describe the reaction of comparatively high-functional polyisocyanates with compounds comprising in a hydroxyl group an isocyanate-reactive group and at least one terminal double bond. The reaction of the isocyanates with this compound gives a viscous liquid which is subsequently polymerized at the double bond, optionally in the presence of further double-bonded compounds such as styrene, to form a solid resin.

What is disadvantageous with the prior art processes is that a burdensome two-step process of preparation is needed and especially the compounds comprising double bonds as well as isocyanate-reactive groups are less customary, and relatively costly, on a large industrial scale. Furthermore, the monool character means that the isocyanate-monool reaction does not build to high molecular weights nor gives crosslinked polyurethanes, which manifests in poorer mechanical properties for the products obtained.

DESCRIPTION

It is an object of the present invention to provide a simple process for improving the mechanical properties of polyurethane at high temperatures and thus make available polyurethanes capable of use in the cathodic electrocoating process for example.

The present invention provides a process for preparing a polyurethane material, said process comprising (a) di- and/or polyisocyanates, (b) compounds having isocyanate-reactive hydrogen atoms, (c) compounds comprising at least one carbon-carbon double bond, (d) optionally a catalyst to hasten the urethane reaction, (e) optionally a free-radical initiator, and (f) optionally further auxiliary and added-substance materials, being mixed into a reaction mixture and cured, wherein the compounds having isocyanate-reactive hydrogen atoms contain on average not less than 1.5 isocyanate-reactive hydrogen groups per molecule, the double bond density of compound (c) is not less than 21% and the double bond functionality of compound (c) is greater than 1 and said compound (c) has no isocyanate-reactive groups, and the equivalence ratio between the isocyanate groups of di- and/or polyisocyanates (a) and the isocyanate-reactive hydrogen atoms of compounds (b) is in the range from 0.8 to 2.

Polyurethane for the purposes of the present invention comprehends any known polyisocyanate polyaddition products. These include addition products formed from isocyanate and alcohol and also modified polyurethanes which may comprise isocyanurate, allophanate, urea, carbodiimide, uretoneimine or biuret structures and further isocyanate addition products. These polyurethanes of the present invention comprise specifically compact polyisocyanate polyaddition products, such as thermosets, and foamed materials based on polyisocyanate polyaddition products, especially rigid polyurethane foams, as well as polyurethane coatings.

In a further preferred embodiment, the polyurethane is a compact polyurethane having a density of preferably more than 850 g/L, preferably 900 to 1400 g/L and more preferably 1000 to 1300 g/L. A compact polyurethane is obtained without admixing a blowing agent. Small amounts of blowing agent, for example water comprised in the polyols as a consequence of the production process, shall not be understood as blowing agent admixture for the purposes of the present invention. The reaction mixture for preparing the compact polyurethane preferably comprises less than 0.2 wt %, more preferably less than 0.1 wt % and especially less than 0.05 wt % of water. The compact polyurethane preferably comprises fillers, especially fibrous fillers. Suitable fillers are described under (e).

Useful di- or polyisocyanates (a) include any aliphatic, cycloaliphatic or aromatic isocyanates known for preparation of polyurethanes, and also any desired mixtures of said isocyanates. Examples are 2,2"-, 2,4"- and 4,4"-diphenylmethane diisocyanate, the mixtures of monomeric diphenylmethane diisocyanates and higher-nuclear homologs of diphenylmethane diisocyanate (polymeric MDI), isophorone diisocyanate (IPDI) or its oligomers, 2,4- or 2,6-tolylene diisocyanate (TDI) or mixtures thereof, tetramethylene diisocyanate or its oligomers, hexamethylene diisocyanate (HDI) or its oligomers, naphthylene diisocyanate (NDI) or mixtures thereof.

Preference for use as di- or polyisocyanates (a) is given to isocyanates based on diphenylmethane diisocyanate, for example 2,4'-MDI, 4,4'-MDI, higher-nuclear homologs of MDI or mixtures of two or more thereof, especially polymeric MDI. The functionality of di- and polyisocyanates (a) is preferably in the range from 2.0 to 2.9 and more preferably in the range from 2.1 to 2.8. The DIN 53019-1 to 3 viscosity of di- or polyisocyanates (a) at 25° C. is preferably between 5 and 600 mPas and more preferably between 10 and 300 mPas.

Di- and polyisocyanates (a) are also usable in the form of polyisocyanate prepolymers. These polyisocyanate prepolymers are obtainable by above-described polyisocyanates (constituent (a-1)) being reacted in excess, for example at temperatures of 30 to 100° C., preferably at about 80° C., with compounds having two or more isocyanate-reactive groups (constituent (a-2)), to form the prepolymer. The NCO content of polyisocyanate prepolymers according to the present invention is preferably in the range from 20 to 33 wt % of NCO, more preferably in the range from 25 to 32 wt % of NCO.

Compounds having two or more isocyanate-reactive groups (a-2) are known to the notional person skilled in the art, having been described, for example in "Kunststoffhandbuch, 7, Polyurethane", Carl Hanser-Verlag, 3rd edition 1993, chapter 3.1. Useful compounds having two or more isocyanate-reactive groups include, for example, polyetherols or polyesterols as described hereinafter under (b). The compounds used as having two or more isocyanate-reactive groups (a-2) are preferably polyetherols or polyesterols comprising secondary OH groups, for example polypropylene oxide. These polyetherols or polyesterols preferably have a functionality of 2 to 4, more preferably of 2 to 3, and a not less than 50%, preferably not less than 75% and especially not less than 85% proportion of secondary OH groups.

Useful compounds having on average not less than 1.5 isocyanate-reactive hydrogen atoms per molecule (b) include any compounds known in polyurethane chemistry and having isocyanate-reactive hydrogen atoms. These have an average functionality of not less than 1.5, preferably from 1.7 to 8, more preferably from 1.9 to 6 and especially from 2 to 4. These include chain extenders and crosslinking agents having an OH functionality of 2 to 6 and a molecular weight of less than 300 g/mol, preferably a functionality of 2 to 4 and more preferably of 2 to 3 and also polymeric compounds having isocyanate-reactive hydrogen atoms and a molecular weight of 300 g/mol or more.

Chain extenders is the appellation for molecules having two isocyanate-reactive hydrogen atoms, while molecules having more than two isocyanate-reactive hydrogens are termed crosslinkers. These are usable individually or preferably in the form of mixtures. Preference is given to using diamines, diols and/or triols having molecular weights below 300 g/mol, more preferably in the range from 62 g/mol to below 300 g/mol and especially in the range from 62 g/mol to 250 g/mol. Suitable are, for example, aliphatic, cycloaliphatic and/or araliphatic or aromatic diamines and diols having 2 to 14, preferably 2 to 10 carbon atoms, such as diethyltoluenediamines (DEDTA), m-phenylenediamines, ethylene glycol, 1,2-propanediol, 2-methyl-1,3-propanediol, 1,3-propanediol, 1,4-butanediol, 1,6-hexanediol, 1,10-decanediol and bis(2-hydroxyethyl)hydroquinone (HQEE), 1,2-, 1,3-, 1,4-dihydroxycyclohexane, bisphenol A bishydroxyethyl (ether), diethylene glycol, dipropylene glycol, tripropylene glycol, triols, such as 1,2,4-, 1,3,5-trihydroxycyclohexane, glycerol and trimethylolpropane, diethanolamines, triethanolamines, and low molecular weight hydroxyl-containing polyalkylene oxides based on ethylene oxide and/or 1,2-propylene oxide and the aforementioned diols and/or triols as starter molecules. Particular preference for use as crosslinkers is given to low molecular weight hydroxyl-containing polyalkylene oxides based on ethylene oxide and/or 1,2-propylene oxide, more preferably 1,2-propylene, and trifunctional starters, especially glycerol and trimethylolpropane. Chain extenders which are particularly preferred are ethylene glycol, 1,2-propanediol, 1,3-propanediol, 2-methyl-1,3-propanediol, 1,4-butanediol, diethylene glycol, bis(2-hydroxyethyl)hydroquinone and dipropylene glycol.

When crosslinkers and/or chain extenders are used, the proportion of crosslinkers and/or chain extenders (e) will typically be in the range from 1 to 50, preferably from 2 to 20 wt %, based on the combined weight of components (a) to (e).

However, the crosslinking or chain-extending agent may also be omitted. To modify the mechanical properties, for example hardness, the addition of chain-extending agents, crosslinking agents or optionally even mixtures thereof may prove advantageous, however.

Polymeric compounds having isocyanate-reactive hydrogen atoms preferably have a number average molecular weight in the range from 400 to 15 000 g/mol. Useful compounds under this heading may thus be selected from the group of polyether polyols, polyester polyols or mixtures thereof.

Polyetherols are for example prepared from epoxies, such as propylene oxide and/or ethylene oxide, or from tetrahydrofuran with active-hydrogen starter compounds, such as aliphatic alcohols, phenols, amines, carboxylic acids, water or natural-based compounds, such as sucrose, sorbitol or mannitol, by using a catalyst. Suitable catalysts here include basic catalysts or double metal cyanide catalysts as described for example in PCT/EP2005/010124, EP 90444 or WO 05/090440.

Polyesterols are for example prepared from aliphatic or aromatic dicarboxylic acids and polyhydric alcohols, polythioether polyols, polyester amides, hydroxyl-containing polyacetals and/or hydroxyl-containing aliphatic polycarbonates, preferably in the presence of an esterification catalyst. Further possible polyols are for example disclosed in "Kunststoffhandbuch, Band 7, Polyurethane", Carl Hanser Verlag, 3rd edition 1993, chapter 3.1.

The polymeric compounds having isocyanate-reactive hydrogen atoms preferably comprise compounds having hydrophobic groups. These are more preferably hydroxyl-functionalized compounds having hydrophobic groups. Such hydrophobic groups have hydrocarbon groups with preferably more than 6, more preferably more than 8 and fewer than 100 and especially more than 10 and fewer than 50 carbon atoms.

The hydroxyl-functionalized hydrophobic compound used is preferably a hydroxyl-functionalized oleochemical compound, an oleochemical polyol. A whole series of hydroxyl-functional oleochemical compounds which can be used are known. Examples are castor oil, hydroxyl-modified oils such as grapeseed oil, black cumin oil, pumpkin kernel oil, borage seed oil, soybean oil, wheat germ oil, rapeseed oil, sunflower oil, peanut oil, apricot kernel oil, pistachio kernel oil, almond oil, olive oil, macadamia nut oil, avocado oil, sea buckthorn oil, sesame oil, hazelnut oil, primula oil, wild rose oil, safflower oil, hemp oil, thistle oil, walnut oil, hydroxyl-modified fatty acid esters based on myristoleic acid, palmitoleic acid, oleic acid, vaccenic acid, petroselic acid, gadoleic acid, erucic acid, nervonic acid, linoleic acid, linolenic acid, stearidonic acid, arachidonic acid, timnodonic acid, clupanodonic acid, cervonic acid. Preference here is given to using castor oil and its reaction products with alkylene oxides or ketone-formaldehyde resins. The last compounds are for example available from Bayer AG under the designation Desmophen® 1150.

A further preferably employed group of oleochemical polyols is derivable by ring-opening of epoxidized fatty acid esters under concurrent reaction with alcohols and optionally subsequent further transesterification reactions. The incorporation of hydroxyl groups in oils and fats is mainly accomplished by epoxidizing the olefinic double bond comprised in these products and then reacting the resultant epoxy groups with a mono- or polyhydric alcohol. This turns the epoxy ring into a hydroxyl group or, in the case of polyhydric alcohols, into a structure having a higher number of OH groups. Since oils and fats are usually glycerol esters, the abovementioned reactions are accompanied by concurrent transesterification reactions. The compounds thus obtained preferably have a molecular weight in the range between 500 and 1500 g/mol. Products of this type are on offer from Cognis and Altropol for example.

Useful compounds (c), comprising at least one carbon-carbon double bond, preferably at least one terminal carbon-carbon double bond, include, for example, compounds comprising one or more vinyl groups. It is an essential integer of the present invention, then, that the double bonds (i.e., the vinyl groups R—CH=CH$_2$) of the compounds of component (c) have a double bond density of in each case not less than 21%, preferably not less than 23% and more preferably not less than 25%. To compute a double bond density for a compound in the manner of the present invention the mass fraction of the terminal double bonds is divided by the entire molecular mass. For the purposes of this computation, a terminal double bond is assumed to have a mass of 27 g/mol (—CH=CH$_2$; 2 times carbon plus 3 times hydrogen).

Compounds (c) comprise no isocyanate-reactive hydrogen atoms. Typical compounds (c) include, for example, butadiene, isoprene, 1,3-pentadiene, 1,5-hexadiene, 1,7-octadiene, vinyl acrylates, vinyl methacrylate, methoxybutadiene, dipropylene glycol diacrylate, trimethylolpropane triacrylate, polybutadiene. The double bond functionality of compound (c) here is greater than 1, for example 2 or 3. When a plurality of compounds (c) are used, the double bond density is the number average double bond density of the components used. Trimethylolpropane triacrylate is the preferred ethylenically unsaturated monomer.

The proportion of compounds comprising at least one carbon-carbon double bond (c) is preferably in the range from 10 to 70 wt %, more preferably in the range from 25 to 60 wt % and especially in the range from 30 to 50 wt %, all based on the combined weight of components (a) to (f).

Useful catalysts (d) include polyurethane catalysts of the customary type. These hasten the reaction of compounds having isocyanate-reactive hydrogen atoms (b) with di- and polyisocyanates (a) to a substantial extent. Customary catalysts useful for preparing the polyurethanes include, for example, amidines, such as 2,3-dimethyl-3,4,5,6-tetrahydropyrimidine, tertiary amines, such as triethylamine, tributylamine, dimethylbenzylamine, N-methylmorpholine, N-ethylmorpholine, N-cyclohexylmorpholine, N,N,N',N'-tetramethylethylenediamine, N,N,N'N-tetramethylbutanediamine, N,N,N'N-tetramethylhexanediamine, pentamethyldiethylenetriamine, tetramethyldiaminoethyl ether, bis(dimethylaminopropyl)urea, dimethylpiperazine, 1,2-dimethylimidazole, 1-azabicyclo(3,3,0)octane, and preferably 1,4-diazabicyclo(2,2,2)octane and alkanolamine compounds, such as triethanolamine, triisopropanolamine, N-methyldiethanolamine, N-ethyldiethanolamine and dimethylethanolamine. Similarly useful are organometallic compounds, preferably organotin compounds, such as tin(II) salts of organic carboxylic acids, e.g., tin(II) acetate, tin(II) octoate, tin(II) ethylhexoate and tin(II) laurate and the dialkyltin(IV) salts of organic carboxylic acids, e.g., dibutyltin diacetate, dibutyltin dilaurate, dibutyltin maleate and dioctyltin diacetate, and also bismuth carboxylates, such as bismuth(III) neodecanoate, bismuth 2-ethylhexanoate and bismuth octanoate or mixtures thereof. Organometallic compounds are usable alone or preferably in combination with strong basic amines. When component (b) is an ester, amine catalysts are preferably used exclusively.

Catalysts (d) are for example usable in a concentration of 0.001 to 5 wt %, especially 0.05 to 2 wt % as catalyst or catalyst combination, based on the weight of component (b).

The double bonds of component (c) may be free-radically polymerized during the polyurethane reaction of components (a) and (b) or in a step subsequent to the polyurethane reaction. Crosslinking the double bonds of the polyurethane material according to the present invention may here be effected via customary free-radical initiators (e), such as peroxides or AIBN. Crosslinking may further also be effected via irradiation with high-energy radiation, for example UV light, electron beam radiation or β- or γ-radiation. A further possible way to effect crosslinking is that of thermal crosslinking at temperatures above 150° C., preferably above 180° C., in the presence of oxygen. The preferred way to crosslink double bonds is via customary free-radical initiators or via irradiation with high-energy radiation, more preferably via customary free-radical initiators.

It is further possible to employ auxiliaries and/or added-substance materials (g). Any auxiliary and added-substance materials known for preparing polyurethanes are usable here. Suitable examples include surface-active substances, blowing agents, foam stabilizers, cell regulators, release agents, fillers, dyes, pigments, flame retardants, hydrolysis control agents, fungistatic and bacteriostatically acting substances. Substances of this type are known and for example described in "Kunststoffhandbuch, Band 7, Polyurethane", Carl Hanser Verlag, 3$^{rd}$ edition 1993, chapters 3.4.4 and 3.4.6 to 3.4.11.

In contrast, epoxy-containing compounds are not required for preparing the polyurethane materials of the present invention. Preferably, the polyurethane material of the present invention comprises substantially no epoxy-containing compounds. As a result, the proportion of epoxy-containing compounds, based on the combined weight of components (a) to (f), is less than 1 wt % and more preferably below 0.1 wt %.

In general, in the preparation of the polyurethane material of the present invention, the di- and/or polyisocyanates (a), the compounds having isocyanate-reactive hydrogen atoms (b) and, if used, further compounds having isocyanate-reactive hydrogen atoms, such as blowing agents for example, are reacted in such amounts that the equivalence ratio between NCO groups of polyisocyanates (a) and the sum total of isocyanate-reactive hydrogen atoms on further components is in the range from 0.8 to 2, preferably in the range from 0.9 to 1.2 and more preferably in the range from 0.95 to 1.1. A 1:1 ratio here corresponds to an isocyanate index of 100.

In one preferred embodiment, the cured polyurethane material of the present invention is obtained in one step. Here "in one step" is to be understood as meaning that the components for preparing the shaped article (a) to (c) and, if present, (d) to (f) are all mixed together before commencement of the reaction and the reaction is subsequently carried on to obtain a cured polyurethane material without the admixture of further compounds and especially without admixture of further compounds comprising isocyanate-reactive groups.

This cured polyurethane material of the present invention is a solid. A solid is concerned in the context of the present invention when the Shore hardness of DIN EN ISO 868 is greater than 10 Shore A, preferably greater than 30 Shore A and especially greater than 50 Shore A. In one further preferred embodiment, the cured polyurethane material of the present invention has a high DIN EN ISO 179-1 Charpy notched impact strength of preferably greater than 10 kJ/m$^2$, more preferably above 20 kJ/m$^2$ and especially greater than 30 kJ/m$^2$. The presence of a cured polyurethane material that is in accordance with the present invention shall be independent of the crosslinking reaction of the double bonds of component (c); that is, the definition of the cured polyurethane material is satisfied as soon as the Shore hardness is attained, irrespective of whether all, some or no double bonds have reacted with one another. The hardness typically continues to rise once the crosslinking reaction of the double bond has taken place.

The specific starting substances (a) to (g) for preparing polyurethanes that are in accordance with the present invention each differ only minimally in quantitative and qualitative terms whether the polyurethane to be prepared as being in accordance with the present invention is a thermoplastic polyurethane, a rigid foam or a thermoset. For instance, no blowing agents are employed for preparing compact polyurethanes and it is strictly difunctional starting substances which are predominantly employed for thermoplastic polyurethane. It is further possible, for example via the functionality and the chain length of the comparatively high molecular weight compound having two or more reactive hydrogen atoms, to vary the elasticity and hardness of the polyurethane that is in accordance with the invention. Modifications of this type are known to the notional person skilled in the art.

The reactants are described for example in EP 0989146 or EP 1460094 for preparing a compact polyurethane and in PCT/EP2005/010955 for preparing a rigid foam. Compound (c) is then additionally admixed in each case to the reactants described in these documents.

The present invention also provides a polyurethane obtainable by a process of the present invention as well as the process of the present invention.

In one preferred embodiment of the present invention, the polyurethane material of the present invention is a polyurethane-type fiber composite material. Its preparation comprises fibers being wetted with the reaction mixture and then cured to form the polyurethane-type fiber composite material. The fibers used are preferably glass fibers, carbon fibers, polyester fibers, natural fibers, such as cellulose fibers, aramid fibers, nylon fibers, basalt fibers, boron fibers, Zylon fibers (poly(p-phenylene-2,6-benzobisoxazole), silicon carbide fibers, asbestos fibers, metal fibers and combinations thereof. Techniques for wetting the fibers are not limited and commonly/generally known. These include for example the filament winding process, the pultrusion process, the hand lamination process and the infusion process such as the vacuum infusion process.

The polyurethane materials of the present invention, especially the polyurethane-type fiber composite materials of the present invention, display an improved level of heat resistance, a raised glass transition temperature, very good resistance to water and hydrophobic liquids and very good sustained loading properties.

For example, polyurethane-type fiber composite materials of the present invention are useful, for example, as adhesives, particularly for thermally greatly stressed regions, structural component parts, for example body exterior parts in a vehicle construction, such as fenders, as ships' hulls, hot-water containers, for example for domestic use, as parts of electrical motors, masts, poles, pylons, for example as utility poles or telegraph poles, insulators and other component parts in high-voltage technology, or rotor blades for wind power systems or as pipes, for example fiber-reinforced pipelines for the oil and gas industry. The polyurethane materials of the present invention are further suitable for use in cathodic electrocoating as employed especially in the automotive industry.

The examples which follow illustrate the invention.
Materials Used:
  polyol 1: castor oil
  polyol 2: glycerol-started polypropylene oxide having a functionality of 3.0 and an OH number of 805 mg KOH/g
  polyol 3: sucrose and diethylene glycol co-started polypropylene oxide/polyethylene oxide with propylene oxide cap having a functionality of 4.5 and an OH number of 400 mg KOH/g
  TMPTA: trimethylolpropane triacrylate, double bond density 26.35
  polyol 5: dipropylene glycol
  DPGDA: dipropylene glycol diacrylate, double bond density 21.5
  iso 1: polymeric MDI Test plaques 2 mm in thickness were cast at an isocyanate index of 120 in accordance with Table 1. Its entries are all parts by weight unless otherwise stated. DSC was subsequently used to determine the glass transition temperature of the samples. To this end, the sample was twice heated from room temperature to 300° C. at a rate of 20 K/min. The glass transition temperature was determined from the data of the second heating.

TABLE 1

| | | | |
|---|---|---|---|
| polyol 1 | 44.8 | 26.7 | 26.7 |
| polyol 2 | 25 | 15 | 15 |
| polyol 3 | 25 | 15 | 15 |
| drier | 5 | 3 | 3 |
| defoamer | 0.2 | 0.2 | 0.2 |
| TMPTA | | 40 | |
| DPGDA | | | 40 |
| iso | | | |
| iso 1 | 100 | 100 | 100 |
| Tg in ° C.; DSC $2^{nd}$ heating | 95 | 179 | 123 |
| temperature of deflection in ° C. under a load of 0.45 MPa (to DIN EN ISO 75-1) | 70 | 150 | not measured |

The polyurethanes of the present invention display a distinctly raised glass transition temperature and improved heat resistance for the polyurethane material of the present invention versus the comparative material without carbon-carbon double bond compound. The table further shows that a high double bond density versus DPGDA leads to distinctly raised glass transition temperatures.

We claim:

1. A process for preparing a polyurethane material, said process consisting of forming a reaction mixture consisting of:
   a) di- and/or polyisocyanates,
   b) compounds having isocyanate-reactive hydrogen atoms,
   c) compounds comprising at least one terminal carbon-carbon double bond,
   d) optionally a catalyst to hasten a urethane reaction,
   e) optionally a free-radical initiator, and
   f) optionally further auxiliary and added-substance materials, curing the reaction mixture to obtain the polyurethane material, and
   optionally free-radical polymerizing the compounds (c) comprising at least one terminal carbon-carbon double bond,
   wherein:
   the compounds (b) having isocyanate-reactive hydrogen atoms contain on average not less than 1.5 isocyanate-reactive hydrogen groups per molecule,
   a double bond density of the compounds (c) is not less than 21% and the compounds (c) have no isocyanate-reactive groups, wherein the double bond density is calculated by dividing a molecular mass of the at least one terminal carbon-carbon double bond (as determined by a molecular formula —CH=CH$_2$) by a total molecular mass of the compounds (c),
   a double bond functionality of the compounds (c) is greater than 1, and
   an equivalence ratio between isocyanate groups of the di- and/or polyisocyanates (a) and the isocyanate-reactive hydrogen atoms of the compounds (b) is in the range from 0.8 to 2.

2. The process according to claim 1 wherein the compounds (b) having isocyanate-reactive hydrogen atoms comprise polymeric compounds having isocyanate-reactive hydrogen atoms and optionally chain extenders and/or crosslinking agents, wherein the polymeric compounds having isocyanate-reactive hydrogen atoms have a molecular weight of 300 g/mol or above and the chain extenders and crosslinking agents have a molecular weight of less than 300 g/mol.

3. The process according to claim 2 wherein the polymeric compounds having isocyanate-reactive hydrogen atoms have an average hydrogen functionality of 2 to 4 and a proportion of secondary OH groups of not less than 50% based on the total number of OH groups.

4. The process according to claim 1 wherein the compounds (b) having isocyanate-reactive hydrogen atoms comprise at least one hydroxyl-functional compound having hydrophobic groups.

5. The process according to claim 1 wherein said di- or polyisocyanates (a) comprise 2,4'-MDI, 4,4'-MDI, polymeric MDI or mixtures of two or more thereof.

6. The process according to claim 1 wherein a proportion of the compounds (c) comprising at least one terminal carbon-carbon double bond is in the range from 10 to 70 wt %, based on a combined weight of components (a) to (f).

7. The process according to claim 1 wherein the compounds (c) comprising at least one terminal carbon-carbon double bond are free-radically polymerized during a polyurethane reaction of components (a) and (b).

8. The process according to claim 1 wherein the free-radical polymerization of the compounds (c) comprising at least one terminal carbon-carbon double bond is initiated via free-radical initiator, irradiation with high-energy radiation or thermally at temperatures above 150° C.

9. The process according to claim 1, wherein the di- or polyisocyanates (a) are polymeric MDI and the compounds (c) are trimethylolpropane triacrylate or dipropylene glycol diacrylate.

10. A polyurethane material obtained by the process according to claim 9.

11. A structural component part comprising the polyurethane material according to claim 10.

12. An adhesive comprising the polyurethane material according to claim 10.

* * * * *